(12) United States Patent
Gowda et al.

(10) Patent No.: US 12,111,932 B2
(45) Date of Patent: Oct. 8, 2024

(54) SECURE BOOT ATTESTATION IN A CLOUD PLATFORM

(71) Applicant: Dell Products L.P., Round Rock, TX (US)

(72) Inventors: Srinivas Giri Raju Gowda, Fremont, CA (US); Shyamkumar T. Iyer, Cedar Park, TX (US); Syama Sundar Poluri, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 264 days.

(21) Appl. No.: 17/812,791

(22) Filed: Jul. 15, 2022

(65) Prior Publication Data

US 2024/0020387 A1 Jan. 18, 2024

(51) Int. Cl.
*G06F 21/57* (2013.01)
*G06F 8/61* (2018.01)

(52) U.S. Cl.
CPC ............. *G06F 21/575* (2013.01); *G06F 8/63* (2013.01)

(58) Field of Classification Search
CPC ..................................................... G06F 21/575
See application file for complete search history.

(56) References Cited

U.S. PATENT DOCUMENTS

| | | | | |
|---|---|---|---|---|
| 10,348,705 | B1* | 7/2019 | Volkanov | H04L 63/065 |
| 2003/0120923 | A1* | 6/2003 | Gilman | G06F 21/10 |
| | | | | 713/170 |
| 2006/0020810 | A1* | 1/2006 | Waltermann | H04L 9/3236 |
| | | | | 713/179 |
| 2016/0077816 | A1* | 3/2016 | Eilam | G06F 8/65 |
| | | | | 717/177 |
| 2017/0085649 | A1* | 3/2017 | Ricket | H04W 48/02 |
| 2017/0257216 | A1* | 9/2017 | Perga | H04W 12/06 |
| 2019/0029060 | A1* | 1/2019 | Kyou | H04W 76/14 |
| 2019/0228401 | A1* | 7/2019 | Ricket | G06F 9/4416 |

* cited by examiner

*Primary Examiner* — Phil K Nguyen

(74) *Attorney, Agent, or Firm* — Amin, Turocy & Watson, LLP

(57) ABSTRACT

A system can receive, in association with a user account, an operating system image that is encrypted with a private key, a manifest generated from a first instance of a manifest generator tool that is configured to identify system provisioning artifacts that is encrypted with the private key, and a public key. The system can install the operating system image on a computing device. The system can generate, with a second instance of the manifest generator tool, a first identification of system provisioning artifacts from the installing of the operating system image. The system can send the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts.

20 Claims, 13 Drawing Sheets

300

(302)

↓

RECEIVING, IN ASSOCIATION WITH A USER ACCOUNT, AN OPERATING SYSTEM IMAGE THAT IS ENCRYPTED WITH A PRIVATE KEY, A MANIFEST GENERATED FROM A FIRST INSTANCE OF A MANIFEST GENERATOR TOOL THAT IS CONFIGURED TO IDENTIFY SYSTEM PROVISIONING ARTIFACTS FROM INSTALLING THE OPERATING SYSTEM IMAGE THAT IS ENCRYPTED WITH THE PRIVATE KEY, AND A PUBLIC KEY THAT CORRESPONDS TO THE PRIVATE KEY 304

↓

INSTALLING THE OPERATING SYSTEM IMAGE ON A COMPUTING DEVICE 306

↓

GENERATING, WITH A SECOND INSTANCE OF THE MANIFEST GENERATOR TOOL, A FIRST IDENTIFICATION OF SYSTEM PROVISIONING ARTIFACTS FROM THE INSTALLING OF THE OPERATING SYSTEM IMAGE ON THE COMPUTING DEVICE 308

↓

SENDING THE FIRST IDENTIFICATION OF SYSTEM PROVISIONING ARTIFACTS TO AN ATTESTATION SERVICE, WHEREIN THE ATTESTATION SERVICE IS CONFIGURED TO COMPARE THE FIRST IDENTIFICATION OF SYSTEM PROVISIONING ARTIFACTS WITH A SECOND IDENTIFICATION OF SYSTEM PROVISIONING ARTIFACTS RECEIVED IN ASSOCIATION WITH THE USER ACCOUNT, AND SEND, FOR ACCESS VIA THE USER ACCOUNT, AN INDICATION OF WHETHER THE FIRST IDENTIFICATION OF SYSTEM PROVISIONING ARTIFACTS MATCHES THE SECOND IDENTIFICATION OF SYSTEM PROVISIONING ARTIFACTS 310

SENDING, FOR ACCESS VIA THE USER ACCOUNT, THE FIRST INSTANCE OF THE MANIFEST GENERATOR TOOL 404

RECEIVING, IN ASSOCIATION WITH THE USER ACCOUNT, THE MANIFEST THAT IS ENCRYPTED WITH THE PRIVATE KEY 406

DETERMINING THAT THE RESOURCE MAP HAS BEEN UPDATED TO PRODUCE AN UPDATED RESOURCE MAP 604

SENDING THE UPDATED RESOURCE MAP TO THE ATTESTATION SERVICE 606

INSTALLING A PUBLIC KEY ASSOCIATED WITH THE USER ACCOUNT THAT IS RECEIVED FROM THE DEVICE 904

↓

CONFIGURING HARDWARE ON THE DEVICE 906

↓

PROVISIONING THE OPERATING SYSTEM IMAGE ON THE DEVICE 908

```
        (1002)
           │
           ▼
┌─────────────────────────────────────────────────────────────┐
│  RECEIVING THE OPERATING SYSTEM IMAGE THAT IS ENCRYPTED     │
│                 WITH A PRIVATE KEY 1004                     │
└─────────────────────────────────────────────────────────────┘
           │
           ▼
┌─────────────────────────────────────────────────────────────┐
│  RECEIVING THE MANIFEST THAT IS ENCRYPTED WITH THE          │
│                  PRIVATE KEY 1006                           │
└─────────────────────────────────────────────────────────────┘
           │
           ▼
┌─────────────────────────────────────────────────────────────┐
│  RECEIVING A PUBLIC KEY THAT CORRESPONDS TO THE             │
│                  PRIVATE KEY 1008                           │
└─────────────────────────────────────────────────────────────┘
           │
           ▼
        (1010)
```

SENDING THE FIRST IDENTIFICATION OF SYSTEM PROVISIONING ARTIFACTS TO THE ATTESTATION SERVICE 1104

↓

THE ATTESTATION SERVICE SENDS, TO BE ACCESSIBLE VIA THE USER ACCOUNT, AN INDICATION OF WHETHER THE FIRST IDENTIFICATION OF SYSTEM PROVISIONING ARTIFACTS MATCHES THE SECOND IDENTIFICATION OF SYSTEM PROVISIONING ARTIFACTS 1106

SECURE BOOT ATTESTATION IN A CLOUD PLATFORM

BACKGROUND

A cloud platform can comprise a group of computers operated by one entity, where another entity is permitted to access resources from the cloud platform.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, in association with a user account, an operating system image that is encrypted with a private key, a manifest generated from a first instance of a manifest generator tool that is configured to identify system provisioning artifacts from installing the operating system image that is encrypted with the private key, and a public key that corresponds to the private key. The system can install the operating system image on a computing device. The system can generate, with a second instance of the manifest generator tool, a first identification of system provisioning artifacts from the installing of the operating system image on the computing device. The system can send the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts.

An example method can comprise receiving, by a system comprising a processor, an operating system image associated with a user account, and a manifest that comprises a first identification of system provisioning artifacts from installing the operating system image. The method can further comprise installing, by the system, the operating system image on a device. The method can further comprise generating, by the system and with a manifest generator tool, a second identification of system provisioning artifacts from the installing of the operating system image on the device. The method can further comprise sending, by the system, the second identification of system provisioning artifacts to an attestation service, wherein the attestation service determines whether the first identification of system provisioning artifacts matches the second identification of system provisioning artifacts that are determined independently of the system.

An example non-transitory computer-readable medium can comprise instructions that, in response to execution, cause a system comprising a processor to perform operations. These operations can comprise receiving, as a result of usage of a user account, an operating system image. The operations can further comprise installing the operating system image on equipment. The operations can further comprise generating a first identification of system provisioning artifacts from installing the operating system image on the equipment. The operations can further comprise sending the first identification of system provisioning artifacts to an attestation service for a determination, by the attestation service, of whether the first identification of system provisioning artifacts matches a second identification of system provisioning artifacts that are determined independently of the system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example process flow that can facilitate secure boot attestation in a cloud platform, in accordance with an embodiment of this disclosure;

FIG. 4 illustrates another example process flow that can facilitate secure boot attestation in a cloud platform, in accordance with an embodiment of this disclosure;

FIG. 6 illustrates another example process flow that can facilitate secure boot attestation in a cloud platform, in accordance with an embodiment of this disclosure;

FIG. 9 illustrates another example process flow that can facilitate secure boot attestation in a cloud platform, in accordance with an embodiment of this disclosure;

FIG. 10 illustrates another example process flow that can facilitate secure boot attestation in a cloud platform, in accordance with an embodiment of this disclosure;

FIG. 11 illustrates another example process flow that can facilitate secure boot attestation in a cloud platform, in accordance with an embodiment of this disclosure;

DETAILED DESCRIPTION

Overview

Figure 1:
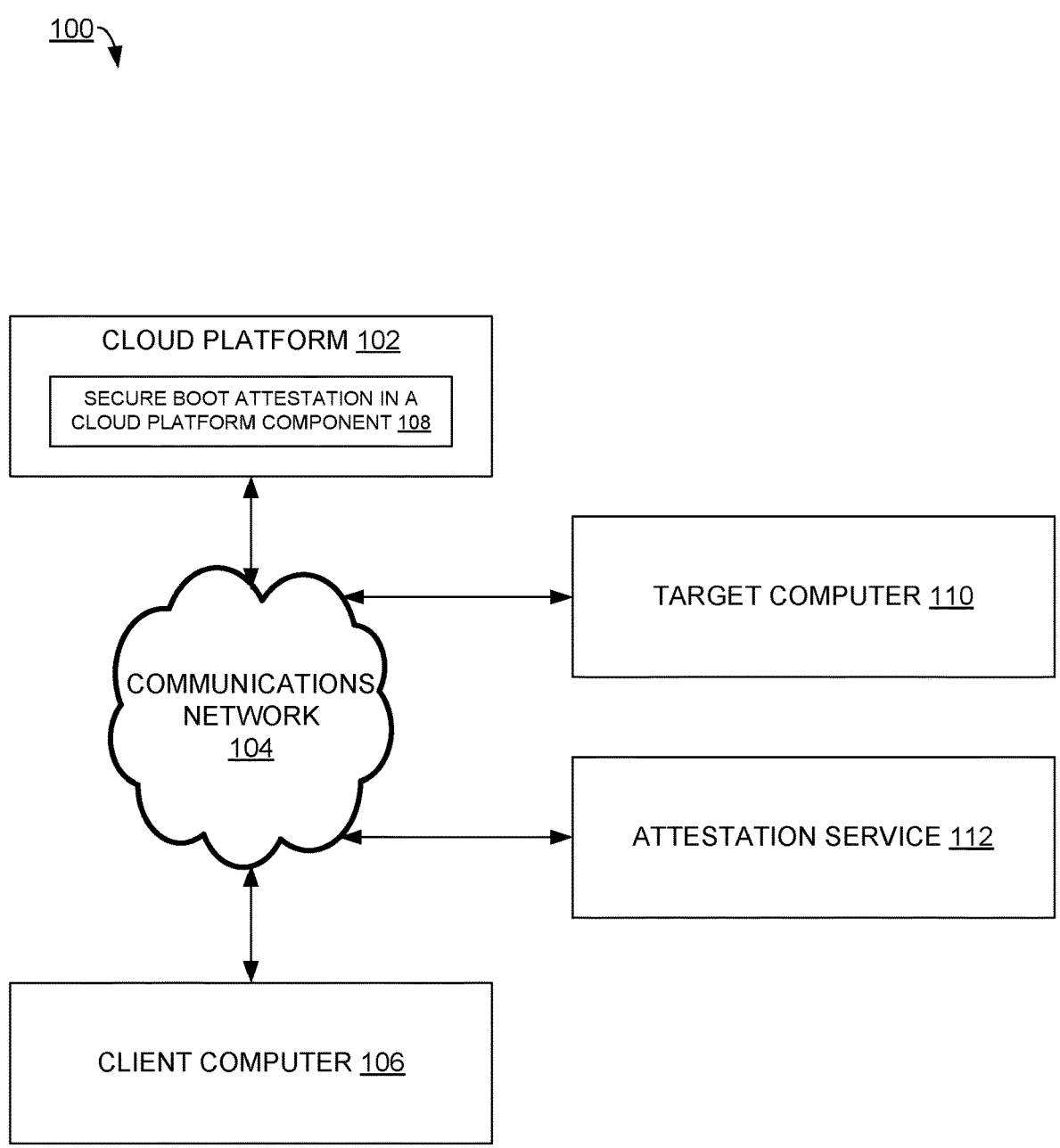
FIG. 1 illustrates an example system architecture that can facilitate secure boot attestation in a cloud platform, in accordance with an embodiment of this disclosure.

In a traditional on-premises environment, a user can securely control the end-to-end provisioning workflow of an operating system. These techniques can be further enhanced on computer platforms that provide an ability to boot and/or install operating system images based on their own keys used for system boot (e.g., Unified Extensible Firmware Interface (UEFI) booting keys). However, such enhanced security features can come with operational challenges in a hosted environment, such as a hosted environment that provides metal-as-a-service (MaaS) (where bare metal servers are provided upon which users can install operating systems and programs).

When a bare metal server is managed, there can be a problem for a user to securely and autonomously validate integrity of a provisioned operating system image, and secure booting of the operating system image using a desired key used for system boot (e.g., a UEFI secure booting key, which can be referred to as a UEFI SecureBoot key). When a bare metal server is managed, there can also be a problem for a user to validate an integrity of the provisioned system.

The present techniques can be implemented to securely provision an operating system on off-premises hardware. A manifest generator tool (which can be referred to as a manifest generator) can be implemented that produces a signed metadata of systems provisioning artifacts. For example, this metadata can include runtime/installable components of an operating system image, a system configuration profile, trusted platform module (TPM) logs, etc. In some examples, this manifest generator tool can be distributed to users and integrated into users' continuous integration (CI)/continuous delivery (CD) techniques. In other examples, this manifest generator tool can be implemented as a software-as-a-service (SaaS) solution as part of an attestation service.

A manifest generator tool can be created and provided to a client by an entity that manages a cloud platform. The client can provide the manifest generator tool with the client's operating system image to be installed on the cloud platform, and a resource map that identifies hardware components of a particular computer type offered by the cloud platform. The manifest generator tool can then output an identification of what system provisioning artifacts will be created as a result of the client having its operating system image installed on that particular hardware type on the cloud platform.

In some examples, an attestation service can provide atomicity in validating securely provisioned artifacts as desired by a user.

A resource registration service can maintain an inventory of platform resources mapped. A user can sign an operating system image using its secure boot private key. The user can provide a signed operating system image and an associated public key to an image registration service.

For a desired deployment configuration that includes a registered operating system and a hardware/software configuration, a user can generate a signed certificate using a manifest generator tool. A user can then share the signed manifest certificate for the desired deployment configuration with a third-party attestation service, and request a MaaS platform to initiate provisioning of the desired resource.

The MaaS platform can then initiate resource provisioning as requested by the user. This resource provisioning can include installing a public key on the platform, configuring hardware and security profiles, and deploying and configuring programs.

Once a deployment is complete, signed metadata can be generated for an installed system that includes all provisioned components of the deployed system—operating system, firmware, hardware, configuration, and attestation status of secure components (e.g., a trusted platform module). This signed metadata of the provisioned system can be shared with the third-party attestation service.

The third-party attestation service can then validate a MaaS platform-signed provision manifest against the user-registered intent manifest.

A user can then review an attestation status of the provisioned resource.

The present techniques can be implemented to provide a secure operating system boot infrastructure for cloud platform clients, where a client can provide the cloud platform with an operating system image to utilize. The present techniques can be implemented to securely provision a client's secure boot keys on a cloud platform-hosted server.

The present techniques can be implemented to assure a client that the provisioned system matches a unique non-tampered identity of a hardware profile; requested genuine hardware; requested hardware configuration on genuine hardware; requested operating system image on genuine hardware; and/or requested program configuration on an operating system image running on genuine hardware.

The present techniques can be implemented to provide a unique mechanism for a cloud platform and its clients to autonomously validate an integrity of a provisioned operating system image and secure booting of the operating system image using a desired secure booting key, and/or validate an integrity of the installed operating system image.

The present techniques can be implemented to provide a unique third-party attestation service that can verify a hardware and program component manifest without becoming a threat, or a threat target.

The present techniques can be implemented so that clients that are used to deploying their own secure boot keys with on-prem hardware can have the same level of trust assurance when deploying their secure boot keys in a cloud platform. By providing an independent third-party attestation service, the present techniques can be implemented to create a unique framework not found in prior approaches.

Example Architecture

FIG. 1 illustrates an example system architecture 100 that can facilitate secure boot attestation in a cloud platform, in accordance with an embodiment of this disclosure.

System architecture 100 comprises monitoring cloud platform 102, communications network 104, client computer 106, target computer 110, and attestation service 112. In turn, cloud platform 102 comprises secure boot attestation in a cloud platform component 108.

Figure 13:
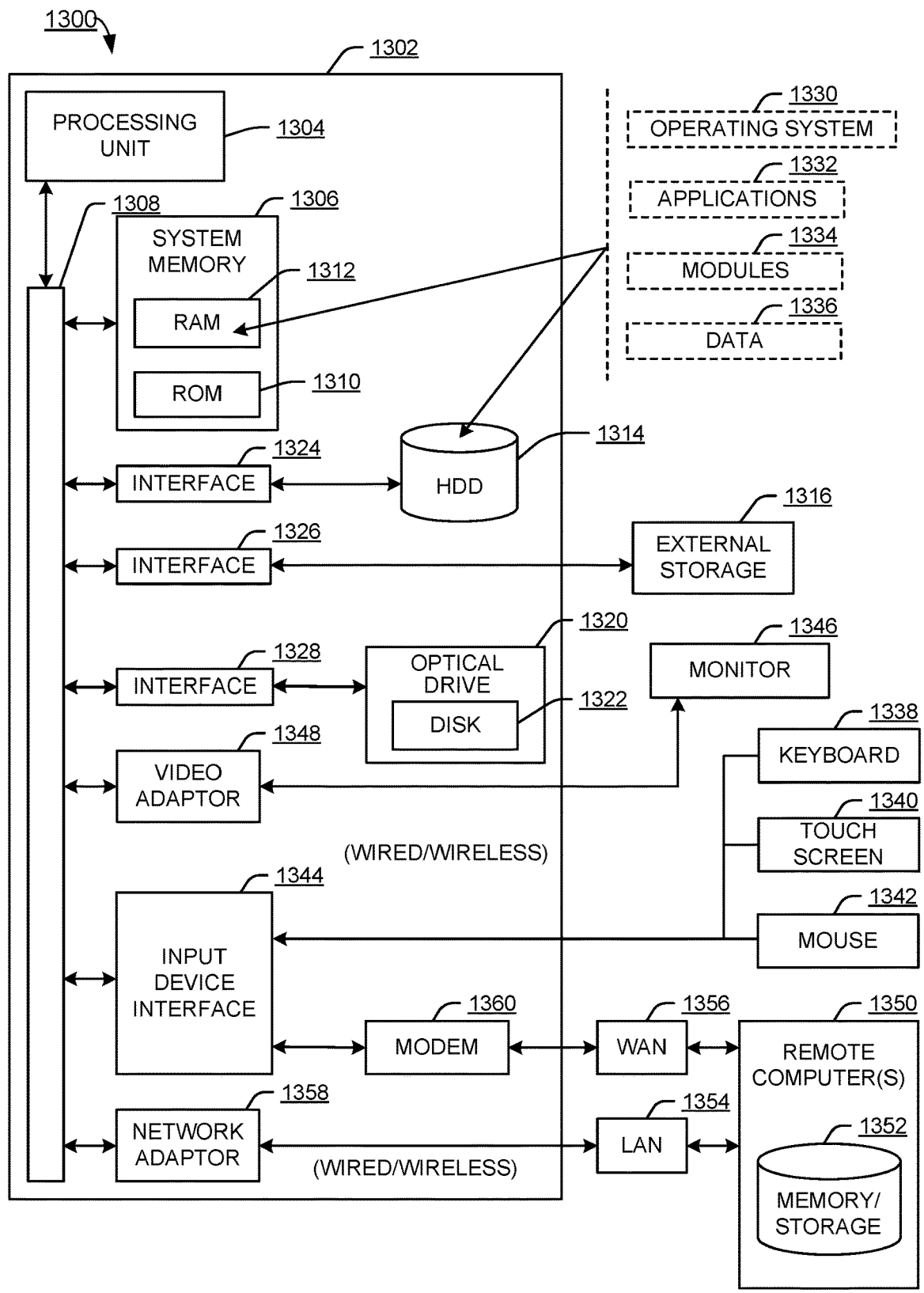
FIG. 13 illustrates an example block diagram of a computer operable to execute an embodiment of this disclosure.

Each of monitoring cloud platform 102, communications network 104, client computer 106, target computer 110, and/or attestation service 112 can be implemented with part(s) of computing environment 1300 of FIG. 13. Communications network 104 can comprise a computer communications network, such as the Internet.

Client computer 106 can provide cloud platform 102 with an operating system image to install on target computer 110 (which can be managed by cloud platform 102). Client computer 106 can also provide a file manifest of files that should be installed on a computer with a same hardware profile (e.g., same number and type of processors) as target computer 110 when the operating system image is installed on target computer 110 to attestation service 112.

Secure boot attestation in a cloud platform component 108 can install the operating system image on target computer 110, and provide a list of system provisioning artifacts involved with the installation to attestation service 112. Attestation service 112 can compare the two lists of system provisioning artifacts to verify that the operating system image has been properly installed on target computer 110.

Where attestation service 112 determines that the system provisioning artifacts match, attestation service 112 can send an indication to client computer 106 that the operating system image was properly installed on target computer 110. Where attestation service 112 determines that the system provisioning artifacts do not match, attestation service 112 can send an indication to client computer 106 that the operating system image was not properly installed on target computer 110.

In some prior approaches, a cloud platform provides possible operating system images for a client to use. The present scenario can differ where a client provides its own operating system image to the cloud platform, and the cloud platform then proves that it properly installed this operating system image (e.g., that the installed operating system is not compromised to introduce a security risk).

In some examples, secure boot attestation in a cloud platform component 108 can implement part(s) of the process flows of FIGS. 2-12 to implement secure boot attestation in a cloud platform.

It can be appreciated that system architecture 100 is one example system architecture for secure boot attestation in a cloud platform, and that there can be other system architectures that facilitate secure boot attestation in a cloud platform.

Example Process Flows

Figure 2:
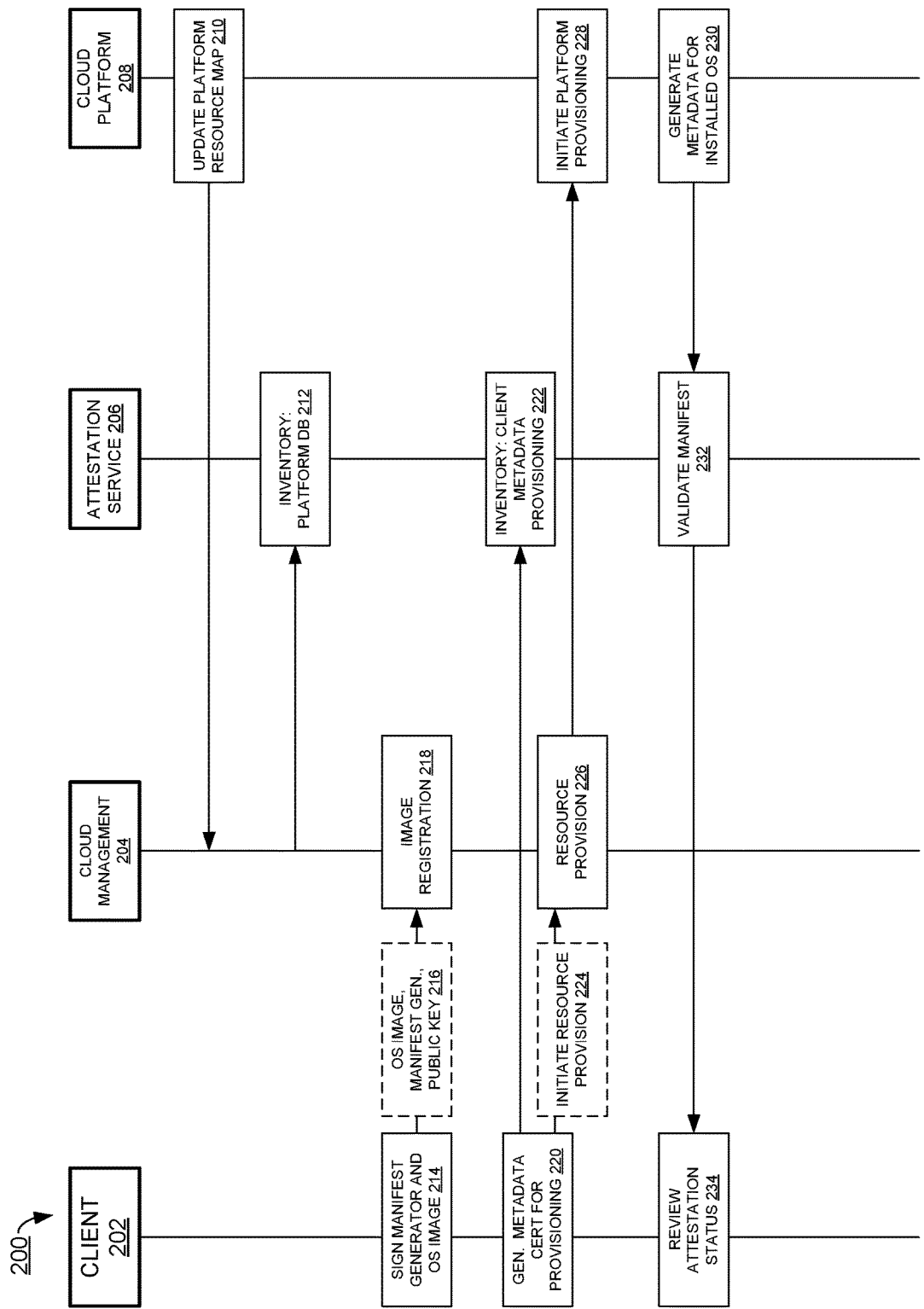
FIG. 2 illustrates an example process flow that can facilitate secure boot attestation in a cloud platform, in accordance with an embodiment of this disclosure.

FIG. 2 illustrates an example process flow 200 that can facilitate secure boot attestation in a cloud platform, in accordance with an embodiment of this disclosure. In some examples, one or more embodiments of process flow 200 can be implemented by system architecture 100 of FIG. 1, or computing environment 1300 of FIG. 13.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

In process flow 200, various operations are performed by client 202, cloud management 204, attestation service 206, and cloud platform 208. Client 202 can be similar to client computer 106 of FIG. 1; cloud management 204 can be similar to a portion of cloud platform 102 that manages cloud platform 102; attestation service 206 can be similar to attestation service 112; and cloud platform 208 can be similar to a portion of cloud platform 102 that hosts target computers (such as target computer 110).

210 depicts cloud platform 208 updating an available platform resource map and sending this information to cloud management 204. Cloud management can store this information and use it to advertise available platform maps to client 202.

Cloud management 204 then sends the updated available platform resource map to attestation service 206, which stores it as inventory: platform database (DB) 212.

214 depicts client 202 signing a manifest and an operating system image. This can comprise signing the manifest and the operating system using a private key (e.g., Secureboot-.Private key). In some examples, client 202 can integrate this operation into a continuous integration (CI)/continuous deployment (CD) pipeline.

216 depicts client 202 sending the operating system image, the manifest, and a public key (e.g., SecureBoot-.Public key) to cloud management 204, which registers the operating system image 218.

220 depicts client 202 generating a signed metadata certificate for a previsioning request (that can comprise a deployment configuration and operating system image). This can be performed with the manifest generator tool. In some examples, the signed metadata certificate of 220 is a superset of information of the metadata of 214. The signed metadata certificate can include additional information that relates to the specific hardware instance upon which the operating system image will be provisioned.

222 depicts client 202 sending the metadata certificate of 220 to attestation service 206, which stores it as inventory: customer metadata provision intent 222.

224 depicts client 202 initiate resource provision 224 to cloud management 204. In turn, cloud management 204 performs resource provision 226, and contacts cloud platform 208 to initiate platform provisioning 228. Initiate platform provisioning 228 can comprise installing a secure boot key, performing hardware configuration, and provisioning an operating system image on the target computer.

230 depicts cloud platform 208 generating a signed metadata for the installed operating system. This can comprise signed metadata for the installed operating system, for the firmware of the target computer, for the hardware of the target computer, and/or for configuration components of the target computer. Similar to the signed metadata certificate of 220, the signed metadata in 230 can comprise a superset of a manifest that identifies system provisioning artifacts from installing an operating system on a hardware configuration. The signed metadata in 230 can include information unknown to client 202, such as a unique identifier of the hardware upon which the operating system image is provisioned.

Cloud platform 208 can then contact attestation service 206 to validate the manifest 232. Validating the manifest can comprise comparing the signed metadata (which can include the manifest) from cloud platform 208 against the metadata certificate (which can include the client's version of the manifest) received from client 202 in 222. Attestation service can determine that these match (so the operating system from client 202 was properly installed on the cloud platform) or that they do not match (so the operating system was not properly installed).

Attestation service 206 can send a result of performing 232 to client 202, which can then review the attestation status 234 to determine that the operating system was, or was not, properly installed on cloud platform 208.

FIG. 3 illustrates an example process flow 300 that can facilitate secure boot attestation in a cloud platform, in accordance with an embodiment of this disclosure. In some examples, one or more embodiments of process flow 300 can be implemented by secure boot attestation in a cloud platform component 108 of FIG. 1, or computing environment 1300 of FIG. 13.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 300 begins with 302, and moves to operation 304.

Operation 304 depicts receiving, in association with a user account, an operating system image that is encrypted with a private key, a manifest generated from a first instance of a manifest generator tool that is configured to identify system provisioning artifacts from installing the operating system image that is encrypted with the private key, and a public key that corresponds to the private key. In some examples, operation 304 can be implemented in a similar manner as OS image, manifest, and public key 216 of FIG. 2, where a cloud platform can receive a signed OS image, a signed manifest, and a public key.

In some examples, the public key is a key that is configured for secure booting of an operating system that corresponds to the operating system image on the computing device. That is, the public key can be a SecureBoot Key.pub.

In some examples, operation 304 comprises registering the operating system image in response to receiving the operating system image in association with the user account. This can be performed in a similar manner as operating system image registration 218 of FIG. 2.

After operation 304, process flow 300 moves to operation 306.

Operation 306 depicts installing the operating system image on a computing device. In some examples, operation 306 can be implemented in a similar manner as resource provision 226 of FIG. 2.

After operation 306, process flow 300 moves to operation 308.

Operation 308 depicts generating, with a second instance of the manifest generator tool, a first identification of system provisioning artifacts from the installing of the operating system image on the computing device. In some examples, operation 308 can be implemented in a similar manner as generate metadata for installed OS 230 of FIG. 3.

After operation 308, process flow 300 moves to operation 310.

Operation 310 depicts sending the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts. In some examples, operation 310 can be implemented in a similar manner as validate manifest 232 of FIG. 2.

After operation 310, process flow 300 moves to 312, where process flow 300 ends.

FIG. 4 illustrates an example process flow 400 that can facilitate secure boot attestation in a cloud platform, in accordance with an embodiment of this disclosure. In some examples, one or more embodiments of process flow 400 can be implemented by secure boot attestation in a cloud platform component 108 of FIG. 1, or computing environment 1300 of FIG. 13.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 400 begins with 402, and moves to operation 404.

Operation 404 depicts sending, for access via the user account, the first instance of the manifest generator tool. In operation 404, cloud management 204 of FIG. 2 can send a manifest generator tool to client 202.

After operation 404, process flow 400 moves to operation 406.

Operation 406 depicts receiving, in association with the user account, the manifest that is encrypted with the private key. In operation 406, cloud management 204 of FIG. 2 can receive from client 202 the manifest from operation 404, where it has been encrypted by client 202 with a private key of client 202.

After operation 404, process flow 400 moves to 408, where process flow 400 ends.

Figure 5:
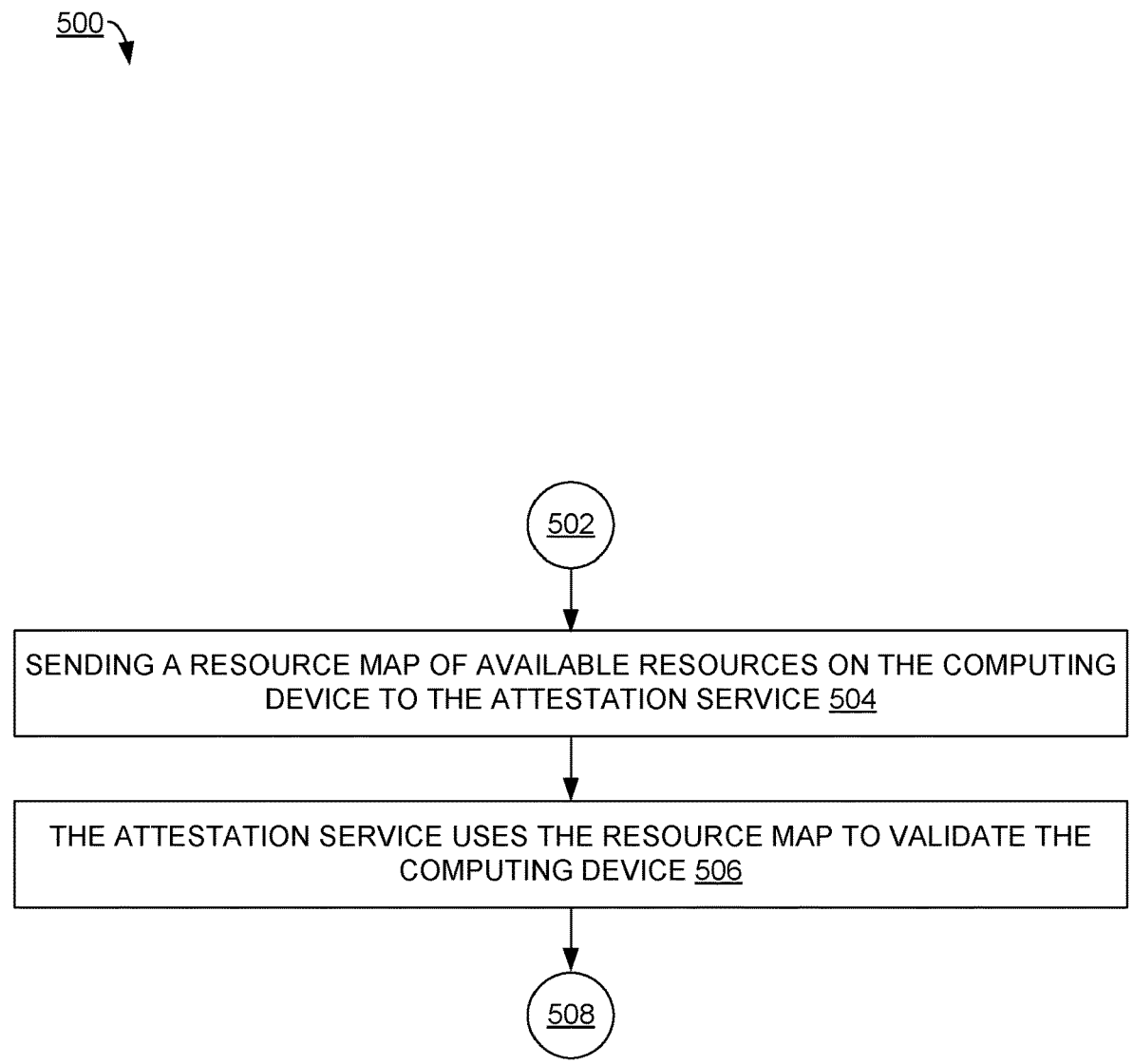
FIG. 5 illustrates another example process flow that can facilitate secure boot attestation in a cloud platform, in accordance with an embodiment of this disclosure.

FIG. 5 illustrates an example process flow 500 that can facilitate secure boot attestation in a cloud platform, in accordance with an embodiment of this disclosure. In some examples, one or more embodiments of process flow 500 can be implemented by secure boot attestation in a cloud platform component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts sending a resource map of available resources on the computing device to the attestation service. This can comprise cloud platform 208 of FIG. 2 sending cloud management 204 (and then to attestation service 206) a platform resource map that is generated in update platform resource map 210.

After operation 504, process flow 500 moves to operation 506.

Operation 506 depicts the attestation service using the resource map to validate the computing device. This can be implemented in a similar manner as validate manifest 232 of FIG. 2, where part of that operation can involve verifying that a hardware configuration of the computing map that is identified in the resource map matches that of the manifests.

After operation 506, process flow 500 moves to 508, where process flow 500 ends.

FIG. 6 illustrates an example process flow 600 that can facilitate secure boot attestation in a cloud platform, in accordance with an embodiment of this disclosure. In some examples, one or more embodiments of process flow 600 can be implemented by secure boot attestation in a cloud platform component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts determining that the resource map has been updated to produce an updated resource map. That is, in some examples, cloud platform 208 can perform update platform resource map 210 in response to determining that a resource map has been updated.

After operation 604, process flow 600 moves to operation 606.

Operation 606 depicts sending the updated resource map to the attestation service. This can comprise cloud platform 208 of FIG. 2 sending cloud management 204 (and then to attestation service 206) an updated platform resource map that is generated in update platform resource map 210.

After operation 604, process flow 600 moves to 608, where process flow 600 ends.

Figure 7:
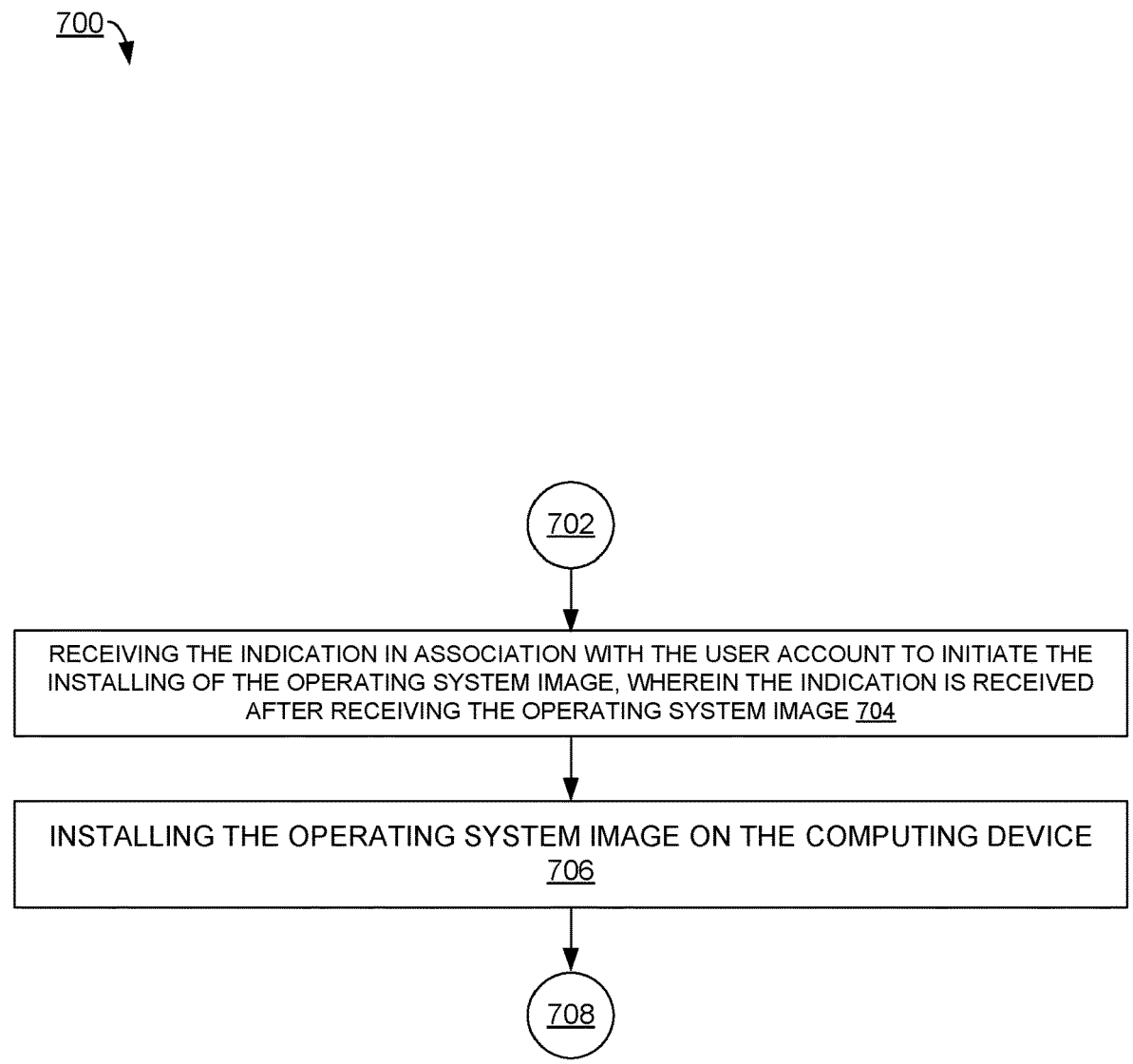
FIG. 7 illustrates another example process flow that can facilitate secure boot attestation in a cloud platform, in accordance with an embodiment of this disclosure.

FIG. 7 illustrates an example process flow 700 that can facilitate secure boot attestation in a cloud platform, in accordance with an embodiment of this disclosure. In some examples, one or more embodiments of process flow 700 can be implemented by secure boot attestation in a cloud platform component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts receiving the indication in association with the user account to initiate the installing of the operating system image, wherein the indication is received after receiving the operating system image. In some examples, this can be implemented in a similar manner as initiate resource provision 224 of FIG. 2.

After operation 704, process flow 700 moves to operation 706.

Operation 706 depicts installing the operating system image on the computing device. In some examples, this can be implemented in a similar manner as resource provision 226 of FIG. 2.

After operation 706, process flow 700 moves to 708, where process flow 700 ends.

Figure 8:
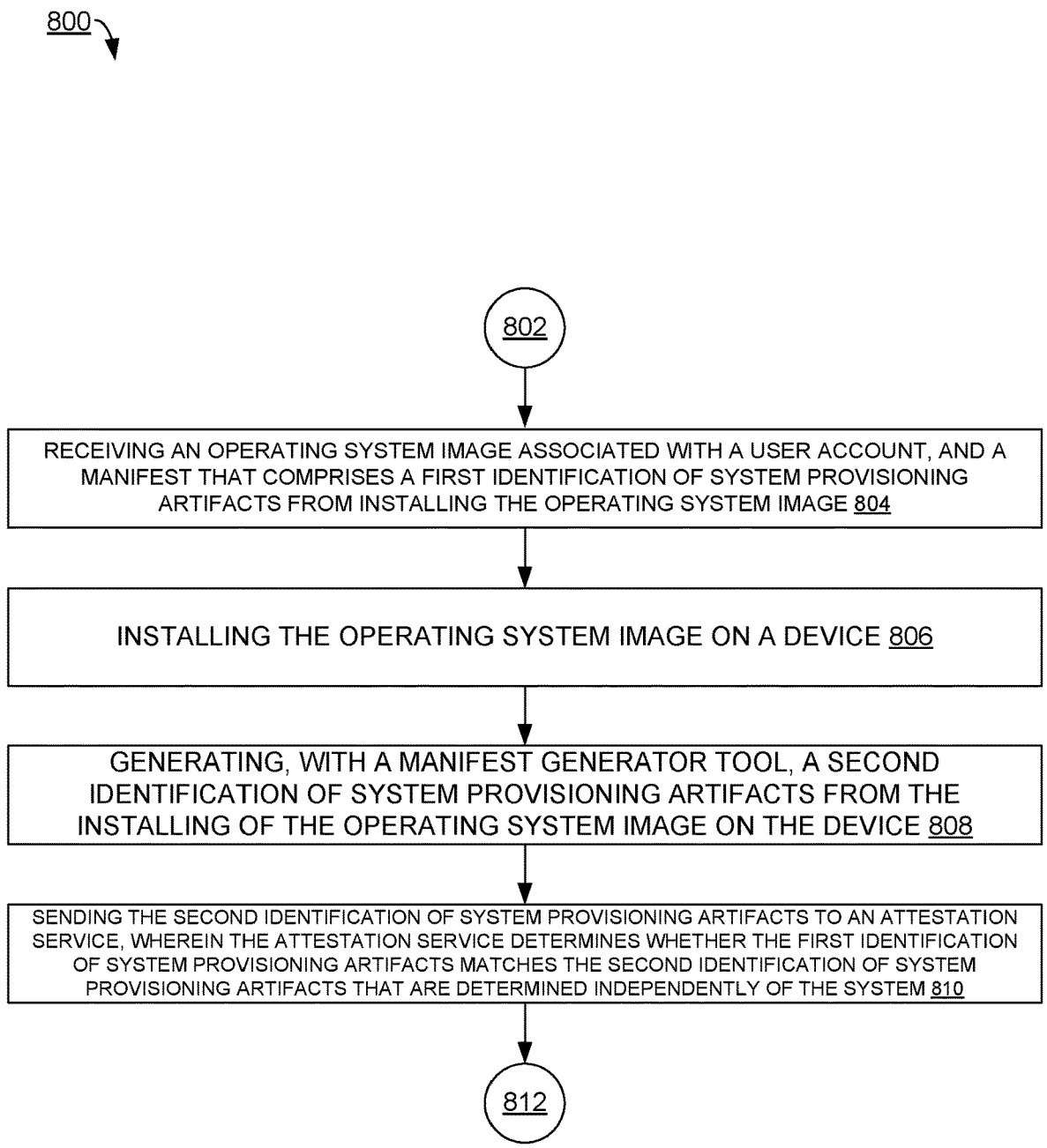
FIG. 8 illustrates another example process flow that can facilitate secure boot attestation in a cloud platform, in accordance with an embodiment of this disclosure.

FIG. 8 illustrates an example process flow 800 that can facilitate secure boot attestation in a cloud platform, in accordance with an embodiment of this disclosure. In some examples, one or more embodiments of process flow 800 can be implemented by secure boot attestation in a cloud platform component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts receiving an operating system image associated with a user account, and a manifest that comprises a first identification of system provisioning artifacts from installing the operating system image. In some examples, operation 804 can be implemented in a similar manner as operation 304 of FIG. 3.

After operation 804, process flow 800 moves to operation 806.

Operation 806 depicts installing the operating system image on a device. In some examples, operation 806 can be implemented in a similar manner as operation 306 of FIG. 3.

In some examples, installing the operating system image on the device results in an installed operating system image, and the first identification of system provisioning artifacts comprises first metadata for the installed operating system image, second metadata for firmware of the device, third metadata for hardware of the device, or fourth metadata for configuration components of the device. That is, these types of metadata can be generated as part of generate metadata for installed OS 230 of FIG. 2.

After operation 806, process flow 800 moves to operation 808.

Operation 808 depicts generating, with a manifest generator tool, a second identification of system provisioning artifacts from the installing of the operating system image on the device. In some examples, operation 808 can be implemented in a similar manner as operation 308 of FIG. 3.

In some examples, the first identification of system provisioning artifacts identifies at least one file that is created from installing the operating system image that is different from a file contained within the operating system image.

In some examples, the first identification of system provisioning artifacts is based on the operating system image, a hardware configuration of the device, and at least one program installed on the device. That is, different things can affect what system provisioning artifacts are created, such as the operating system image, and a hardware/software configuration of a target server.

After operation 808, process flow 800 moves to operation 810.

Operation 810 depicts sending the second identification of system provisioning artifacts to an attestation service, wherein the attestation service determines whether the first identification of system provisioning artifacts matches the second identification of system provisioning artifacts that are determined independently of the system. In some examples, operation 810 can be implemented in a similar manner as operation 310 of FIG. 3.

After operation 810, process flow 800 moves to 812, where process flow 800 ends.

FIG. 9 illustrates an example process flow 900 that can facilitate secure boot attestation in a cloud platform, in accordance with an embodiment of this disclosure. In some examples, one or more embodiments of process flow 900 can be implemented by secure boot attestation in a cloud platform component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts installing a public key associated with the user account that is received from the device. In some examples, this can be implemented in a similar manner as initiate platform provisioning 228 of FIG. 2 as it relates to installing a secure boot key.

After operation 904, process flow 900 moves to operation 906.

Operation 906 depicts configuring hardware on the device. In some examples, this can be implemented in a similar manner as initiate platform provisioning 228 of FIG. 2 as it relates to hardware configuration.

After operation 906, process flow 900 moves to operation 908.

Operation 908 depicts provisioning the operating system image on the device. In some examples, this can be implemented in a similar manner as initiate platform provisioning 228 of FIG. 2 as it relates to provisioning an OS image.

After operation 908, process flow 900 moves to 910, where process flow 900 ends.

FIG. 10 illustrates an example process flow 1000 that can facilitate secure boot attestation in a cloud platform, in accordance with an embodiment of this disclosure. In some examples, one or more embodiments of process flow 1000 can be implemented by secure boot attestation in a cloud platform component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts receiving the operating system image that is encrypted with a private key. That is, process flow 1000 can be implemented in a similar manner as OS image, manifest, and public key 216 of FIG. 2. In operation 1004, cloud management 204 can receive the OS image that has been encrypted by client 202.

After operation 1004, process flow 1000 moves to operation 1006.

Operation 1006 depicts receiving the manifest that is encrypted with the private key. In operation 1004, cloud management 204 can receive the manifest that has been encrypted by client 202.

After operation 1006, process flow 1000 moves to operation 1008.

Operation 1008 depicts receiving a public key that corresponds to the private key. In operation 1004, cloud management 204 can receive public key.

After operation 1008, process flow 1000 moves to 1010, where process flow 1000 ends.

FIG. 11 illustrates an example process flow 1100 that can facilitate secure boot attestation in a cloud platform, in accordance with an embodiment of this disclosure. In some examples, one or more embodiments of process flow 1100 can be implemented by secure boot attestation in a cloud platform component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts sending the first identification of system provisioning artifacts to the attestation service. This can be implemented in a similar manner as generate metadata for installed OS 230 of FIG. 2.

After operation 1104, process flow 1100 moves to operation 1106.

Operation 1106 depicts the attestation service sends, to be accessible via the user account, an indication of whether the first identification of system provisioning artifacts matches the second identification of system provisioning artifacts. This can be implemented in a similar manner as validate manifest 232 of FIG. 2.

After operation 1106, process flow 1100 moves to 1108, where process flow 1100 ends.

Figure 12:
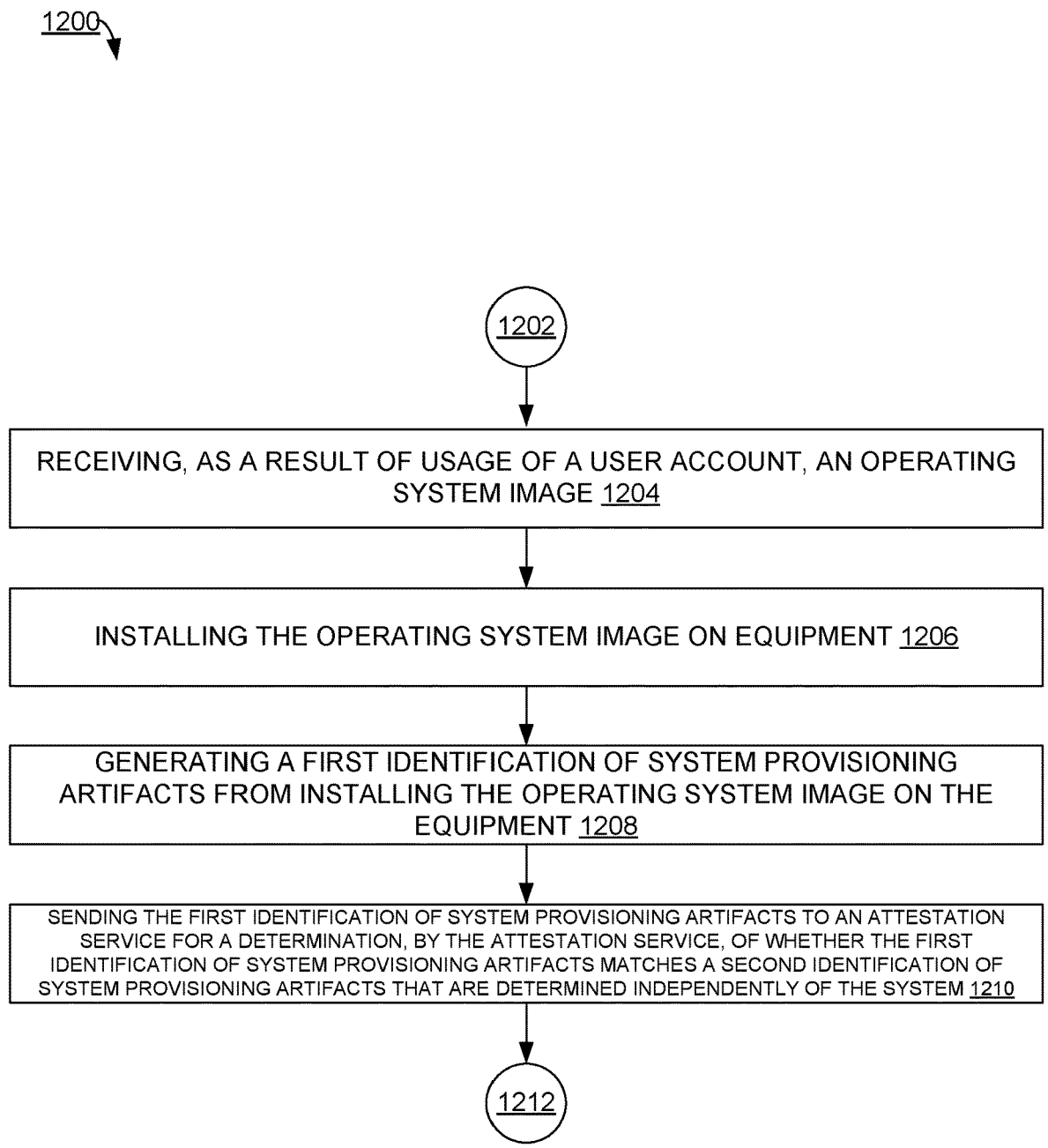
FIG. 12 illustrates another example process flow that can facilitate secure boot attestation in a cloud platform, in accordance with an embodiment of this disclosure.

FIG. 12 illustrates an example process flow 1200 that can facilitate secure boot attestation in a cloud platform, in accordance with an embodiment of this disclosure. In some examples, one or more embodiments of process flow 1200 can be implemented by secure boot attestation in a cloud platform component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts receiving, as a result of usage of a user account, an operating system image. In some examples, operation 1204 can be implemented in a similar manner as operation 304 of FIG. 3.

In some examples, operation 1204 comprises receiving the operating system image that is encrypted with a private key, the second indication of system provisioning artifacts that is encrypted with the private key, and a public key that corresponds to the private key. That is, the user can encrypt an OS image and manifest, and provide a public key. This can be implemented in a similar manner as OS image, manifest, and public key 216 of FIG. 2.

After operation 1204, process flow 1200 moves to operation 1206.

Operation 1206 depicts installing the operating system image on equipment. In some examples, operation 1206 can be implemented in a similar manner as operation 306 of FIG. 3.

After operation 1206, process flow 1200 moves to operation 1208.

Operation 1208 depicts generating a first identification of system provisioning artifacts from installing the operating system image on the equipment. In some examples, operation 1208 can be implemented in a similar manner as operation 308 of FIG. 3.

After operation 1208, process flow 1200 moves to operation 1210.

Operation 1210 depicts sending the first identification of system provisioning artifacts to an attestation service for a determination, by the attestation service, of whether the first identification of system provisioning artifacts matches a second identification of system provisioning artifacts that are determined independently of the system. In some examples, operation 1210 can be implemented in a similar manner as operation 310 of FIG. 3.

In some examples, the equipment is first equipment, and the second identification of system provisioning artifacts is determined from second equipment that is controlled via authorized access of the user account. That is, a manifest generator tool can be distributed to users to facilitate them integrating it as part of a continuous integration (CI)/continuous deployment (CD) process.

In some examples, the second identification of system provisioning artifacts is determined by the attestation service.

In some examples, the equipment is first equipment, wherein the attestation service is separate from second equipment associated with the user account, and wherein the attestation service is separate from third equipment that performs the installing, the generating, and the sending. That is, a manifest generator tool can be implemented as a manifest generator tool service (e.g., a software-as-a-service (SaaS) solution) by a third-party attestation service.

In some examples, operation 1210 comprises sending the first identification of system provisioning artifacts to the attestation service, wherein the attestation service sends, for authorized access via the user account, an indication of whether the first identification of system provisioning artifacts matches the second identification of system provisioning artifacts. This can be implemented in a similar manner as generate metadata for installed OS 230, validate manifest 232, and/or review attestation status 234.

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of cloud platform 102, client computer 106, target computer 110 and/or attestation service 112 of FIG. 1.

In some examples, computing environment 1300 can implement one or more embodiments of the process flows of FIGS. 3-12 to facilitate secure boot attestation in a cloud platform.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a processor; and
a memory coupled to the processor, comprising instructions that cause the processor to perform operations comprising:
receiving, in association with a user account, an operating system image that is encrypted with a private key, a manifest generated from a first instance of a manifest generator tool that is configured to identify system provisioning artifacts from installing the operating system image that is encrypted with the private key, and a public key that corresponds to the private key;
installing the operating system image on a computing device;
generating, with a second instance of the manifest generator tool, a first identification of system provisioning artifacts from the installing of the operating system image on the computing device; and
sending the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts.

2. The system of claim 1, wherein the operations further comprise:
sending, for access via the user account, the first instance of the manifest generator tool before receiving, in association with the user account, the manifest that is encrypted with the private key.

3. The system of claim 1, wherein the operations further comprise:
sending a resource map of available resources on the computing device to the attestation service, wherein the attestation service is configured to use the resource map to validate the computing device.

4. The system of claim 3, wherein the operations further comprise:

in response to determining that the resource map has been updated to produce an updated resource map, sending the updated resource map to the attestation service.

5. The system of claim 1, wherein the public key is a key that is configured for secure booting of an operating system that corresponds to the operating system image on the computing device.

6. The system of claim 1, wherein the operations further comprise:

registering the operating system image in response to receiving the operating system image in association with the user account.

7. The system of claim 1, wherein the operations further comprise installing the operating system image on the computing device in response to receiving the indication in association with the user account to initiate the installing of the operating system image, wherein the indication is received after receiving the operating system image.

8. The method of claim 1, further comprising:

sending, by the system, a resource map of available resources on the computing device to the attestation service, wherein the attestation service is configured to use the resource map to validate the computing device.

9. The method of claim 8, further comprising:

in response to determining that the resource map has been updated to produce an updated resource map, sending, by the system, the updated resource map to the attestation service.

10. A method, comprising:

receiving, by a system comprising a processor, in association with a user account, an operating system image that is encrypted with a private key, a manifest generated from a first instance of a manifest generator tool that is configured to identify system provisioning artifacts from installing the operating system image that is encrypted with the private key, and a public key that corresponds to the private key;

installing, by the system, the operating system image on a device;

generating, by the system and with a second instance of a manifest generator tool, a first identification of system provisioning artifacts from the installing of the operating system image on the device; and sending, by the system, the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts.

11. The method of claim 10, wherein installing the operating system image on the device comprises:

installing a public key associated with the user account that is received from the device;
configuring hardware on the device; and
provisioning the operating system image on the device.

12. The method of claim 10, wherein installing the operating system image on the device results in an installed operating system image, wherein the system provisioning artifacts comprises first metadata for the installed operating system image, second metadata for firmware of the device, third metadata for hardware of the device, or fourth metadata for configuration components of the device.

13. The method of claim 10, wherein the system provisioning artifacts identify at least one file that is created from installing the operating system image that is different from a file contained within the operating system image.

14. The method of claim 10, wherein the system provisioning artifacts are based on the operating system image, a hardware configuration of the device, and at least one program installed on the device.

15. The method of claim 10, further comprising:

sending, by the system and for access via the user account, the first instance of the manifest generator tool before receiving, in association with the user account, the manifest that is encrypted with the private key.

16. A non-transitory computer-readable medium comprising instructions that, in response to execution, cause a system comprising a processor to perform operations, comprising:

receiving, as a result of usage of a user account, an operating system image that is encrypted with a private key, a manifest generated from a first instance of a manifest generator tool that is configured to identify system provisioning artifacts from installing the operating system image that is encrypted with the private key, and a public key that corresponds to the private key;

installing the operating system image on equipment;

generating, with a second instance of the manifest generator tool, a first identification of system provisioning artifacts from installing the operating system image on the equipment; and sending the first identification of system provisioning artifacts to an attestation service, wherein the attestation service is configured to compare the first identification of system provisioning artifacts with a second identification of system provisioning artifacts received in association with the user account, and send, for access via the user account, an indication of whether the first identification of system provisioning artifacts matches the second identification of system provisioning artifacts.

17. The non-transitory computer-readable medium of claim 16, wherein the equipment is first equipment, and wherein the first identification of system provisioning artifacts is determined from second equipment that is controlled via authorized access of the user account.

18. The non-transitory computer-readable medium of claim 16, wherein the first identification of system provisioning artifacts is determined by the attestation service.

19. The non-transitory computer-readable medium of claim 16, wherein the equipment is first equipment, wherein the attestation service is separate from second equipment associated with the user account, and wherein the attestation service is separate from third equipment that performs the installing, the generating, and the sending.

20. The non-transitory computer-readable medium of claim 16, wherein the public key is a key that is configured for secure booting of an operating system that corresponds to the operating system image on the computing device.

* * * * *